Figure 1:
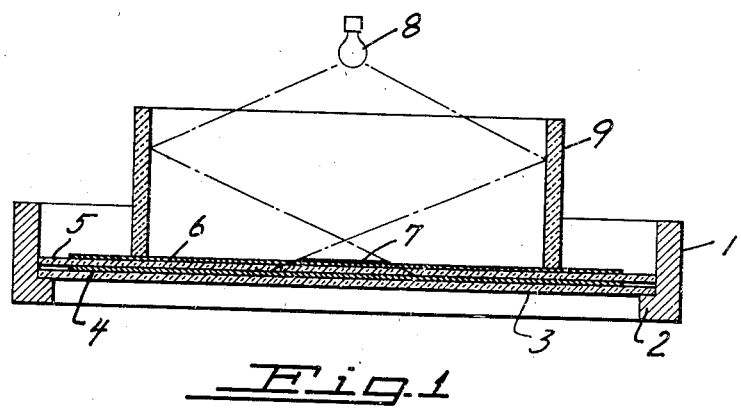

March 1, 1949.                J. FELDER                2,463,093
        DEVICE FOR ENLARGING OR REDUCING OUTLINES
              OF IMAGES IN COLOR PRINTING
                   Filed Jan. 16, 1945

INVENTOR.
Joseph Felder
BY
A. Schapp
ATTORNEY

Patented Mar. 1, 1949

2,463,093

UNITED STATES PATENT OFFICE 2,463,093

DEVICE FOR ENLARGING OR REDUCING OUTLINES OF AN IMAGE IN COLOR PRINTING

Joseph Felder, Oakland, Calif.

Application January 16, 1945, Serial No. 573,012

2 Claims. (Cl. 95—73)

The present invention relates to improvements in color printing, and its principal object is to provide a simple means for and process of enlarging or reducing the outlines of an image with respect to the background by photographic process.

In the art of color printing it becomes necessary to strip or segregate a film into component parts representative of different colors. When, for instance, a negative is used to print the black plates of the yellow, red and blue components of the picture, such as advertizing matter, the areas which are to print as blue and red are covered with opaque or masking paper so that they will not be included in the black plate representing the yellow component.

After the black print is made of the yellow component, the areas which are to print yellow and red are covered and the black plate representing the blue component of the picture is made. Similarly the black plate representing the red component of the picture is made by covering the yellow and blue components.

It is essential, of course, that when these components are re-assembled by superimposing one upon the other to reproduce the entire picture, the components be made to exactly register and match so that no blank spaces be left between the component parts.

It is found necessary, for this purpose, to enlarge the image of one or more of the components with respect to their background so as to create a slight overlap, say about one thirty-second of an inch, the preferred method being to cause the darker color to overlap the lighter shades.

In other operations, as when it is desired to underlay a line of letters or a drawing with another color to change or to strengthen it to a desired color, the assisting color, in order to prevent difficulties in registration, should be reduced in area and should be kept inside the principal drawing color, thus calling for an image the outline of which has been set back slightly as compared with the original image.

It has been customary to accomplish this correction of the outlines of certain images with respect to their background manually by more or less complicated processes, and it is proposed in the present invention to provide a simple means for and method of enlarging, or reducing, as the case may be, the outline or area of an image on a film with respect to its background by a simple photographic process.

Further objects and advantages of my invention will appear as the specification proceeds, and the novel features of the same will be fully defined in the claims hereto appended.

The preferred form of my invention and of the manner of executing the same is illustrated in the accompanying drawing, forming part of this application, in which:

Figure 1 shows a vertical section through apparatus used in my invention; and

Figure 2:
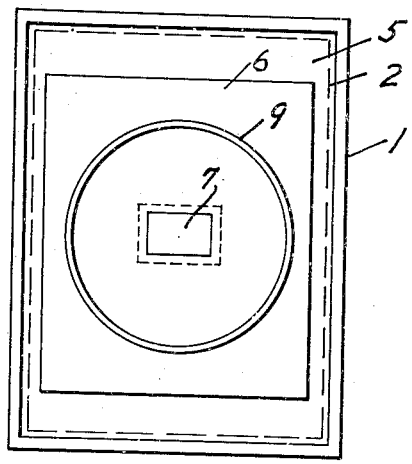

Figure 2, a plan view through the same.

While I have shown only the preferred form of my invention, I wish to have it understood that various changes or modifications may be made within the scope of the claims hereto appended, without departing from the spirit of the invention.

Referring to the drawing in detail, the figures illustrated, show the invention in its simplest form, such as might be used by an amateur, but the same principle applies to methods used in commercial photolithographing and photoengraving.

A simple printing frame is shown at 1 and is provided with a suitable ledge 2 to support a glass plate 3. A new film 4 is placed on top of the glass plate and a transparent plate 5, preferably of cellulose material, is superimposed on the new film.

A second film 6 to be photographed is placed on top of the plate 5. This film carries the image of one of the color components of the original picture, say a rectangular field 7 to appear in red in the final product.

It is the object of the present invention, in one of its uses, to photograph this image on the lower film 4 in such a manner that in the photographed image the outline is pushed outward slightly to produce a larger image area, so that when the different components of the original picture are superimposed upon one another for registry, the red field will slightly overlap on the surrounding field, which may be yellow, for instance, whereby any possible blank spaces between the fields are eliminated.

In another case it is desired to photograph the image in such a manner that the outlines of the photographed image stay inside of the outlines of the original image, so that when the latter is made to cover the former, the photographed image stays well within the confines of the original image.

For photographing the image on the lower film I provide a source of light 8 centrally above the frame at a suitable distance in accordance with conventional practice. In addition thereto I provide an annular mirror 9 on top of the film to be photographed so as to surround the image 7.

The mirror 9 may be of any suitable form, circular or polygonal, or consisting of a number of pieces suitably placed to accomplish the purpose, and may be of any suitable height to carry out the objects of the invention.

During the photographic process, light rays striking the mirror will be deflected and will pass through the light portion of the upper film from all sides in angular direction. Since the upper film is spaced from the lower film through the interposed transparent plate 5, the angular light rays will project a modified image with a border line either projecting beyond or receding from that of the original image, the degree of change depending upon the thickness of the interposed plate of transparent material.

If the upper film is a negative, with the image transparent against a dark background, the angular rays will increase the size of the image on the lower film, and vice versa, if the image of the upper film is dark on a transparent background, the angular rays will extend the background to encroach upon and reduce the size of the image.

I claim:

1. In means for producing a modified film image, means for supporting an unexposed sensitive film strip, a transparent sheet of material superimposed on the film for receiving the image-carrying film thereon, a source of light mounted centrally above the image carrying film for passing light rays therethrough in substantially perpendicular direction, and a cylindrical reflector mounted in co-axial relation with the source of light and so as to encircle the image carrying film for deflecting light rays to pass through the latter film and the sheet of material in angular direction so as to produce a modified image of enlarged or reduced outline on the first film.

2. In means for producing a modified film image, means for supporting an unexposed sensitive film strip, a transparent sheet of material superimposed on the film for receiving the image-carrying film thereon, a source of light mounted centrally above the image-carrying film for passing light rays therethrough in substantially perpendicular direction, and a cylindrical reflector mounted in co-axial relation with the source of light and so as to encircle the image carrying film for deflecting light rays to pass through the latter film and the sheet of material in angular direction so as to produce a modified image of enlarged or reduced outline on the first film, the source of light being mounted slightly above the upper rim of the reflector and being disposed to allow light rays emanating above the horizontal plane of the source to dissipate into the atmosphere.

JOSEPH FELDER.

REFERENCES CITED

The following references are of record in the file of this patent:

UNITED STATES PATENTS

| Number | Name | Date |
| --- | --- | --- |
| 242,412 | Guillebaud | May 31, 1881 |
| 926,377 | Albert | June 29, 1909 |
| 1,052,732 | Ley | Feb. 11, 1913 |
| 1,230,532 | Sterling | June 19, 1917 |
| 1,859,620 | Dyer | May 24, 1932 |
| 1,978,559 | Zimmermann | Oct. 30, 1934 |
| 2,173,118 | Huggins | Oct. 31, 1939 |
| 2,178,933 | Davis | Nov. 7, 1939 |
| 2,286,883 | Weber | June 16, 1942 |
| 2,365,225 | Stiffler | Dec. 19, 1944 |
| 2,407,211 | Yule | Sept. 3, 1946 |